United States Patent
Song et al.

(10) Patent No.: US 8,410,905 B2
(45) Date of Patent: Apr. 2, 2013

(54) RFID READER CANCELLING LEAKAGE SIGNAL

(75) Inventors: Il-Jong Song, Yongin-si (KR); Si-Gyoung Koo, Seoul (KR); Jin-Hun Koo, Seongnam-si (KR); Young-Hoon Min, Anyang-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 815 days.

(21) Appl. No.: 12/170,723

(22) Filed: Jul. 10, 2008

(65) Prior Publication Data

US 2009/0015378 A1 Jan. 15, 2009

(30) Foreign Application Priority Data

Jul. 10, 2007 (KR) .......................... 10-2007-0069260
Nov. 30, 2007 (KR) .......................... 10-2007-0123583

(51) Int. Cl.
*H04Q 5/22* (2006.01)
(52) U.S. Cl. .................. 340/10.1; 340/572.1; 340/572.4
(58) Field of Classification Search .................. None
See application file for complete search history.

(56) References Cited

U.S. PATENT DOCUMENTS

| | | | |
|---|---|---|---|
| 5,444,864 A | 8/1995 | Smith | |
| 6,567,649 B2 * | 5/2003 | Souissi | 455/83 |
| 6,603,391 B1 | 8/2003 | Greeff et al. | |
| 7,170,353 B2 * | 1/2007 | Amano | 330/295 |
| 7,392,024 B2 * | 6/2008 | Suematsu et al. | 455/130 |
| 7,671,720 B1 * | 3/2010 | Martin et al. | 340/10.1 |
| 7,899,142 B2 * | 3/2011 | Hayashi et al. | 375/346 |
| 2004/0014449 A1 * | 1/2004 | Adachi et al. | 455/296 |
| 2006/0033607 A1 * | 2/2006 | Bellantoni | 340/10.1 |
| 2006/0098765 A1 * | 5/2006 | Thomas et al. | 375/346 |
| 2006/0267734 A1 * | 11/2006 | Taki et al. | 340/10.4 |
| 2007/0117511 A1 * | 5/2007 | Kwon et al. | 455/63.1 |
| 2007/0217488 A1 * | 9/2007 | Smaini et al. | 375/219 |
| 2008/0041953 A1 * | 2/2008 | Frederick et al. | 235/451 |
| 2008/0079547 A1 * | 4/2008 | Alicot et al. | 340/10.3 |
| 2010/0216413 A1 * | 8/2010 | Khannur | 455/78 |

FOREIGN PATENT DOCUMENTS

| EP | 1722314 A1 * | 11/2006 |
|---|---|---|
| KR | 100617322 | 8/2006 |
| KR | 1020070020719 | 2/2007 |

* cited by examiner

*Primary Examiner* — Jennifer Mehmood
*Assistant Examiner* — Brian Wilson
(74) *Attorney, Agent, or Firm* — F. Chau & Associates, LLC

(57) ABSTRACT

A radio frequency identification (RFID) recorder for cancelling a leakage signal includes a digital unit calculating and storing an amplitude and a phase of the leakage signal, and a leakage cancellation circuit generating a leakage cancellation signal to cancel the leakage signal in response to a control of the digital unit.

10 Claims, 10 Drawing Sheets

When there is no leakage signal ($S_L$)

When there is leakage signal ($S_L$)

(a) Coupler Leakage
(b) Antenna Return Loss

RFID READER CANCELLING LEAKAGE SIGNAL

CROSS-REFERENCE TO RELATED APPLICATIONS

This application claims priority from Korean Patent Application No. 10-2007-0069260, filed on Jul. 10, 2007; and Korean Patent Application No. 10-2007-0123583, filed on Nov. 30, 2007, the entire contents of which are hereby incorporated by reference.

BACKGROUND OF THE INVENTION

The present disclosure relates to a radio frequency identification (hereinafter, referred to as RFID) reader, and more particularly, to an RFID reader capable of cancelling a leakage signal.

An RFID reader separates a transmit signal from a receive signal through a directional coupler. The RFID reader transmits the transmit signal from a transmitter toward an antenna direction, and receives the receive signal of an antenna toward a receiver direction. However, because of the imperfect transmit/receive isolation of the directional coupler a leakage signal is produced in a receiver direction through the directional coupler.

FIG. 1 is a block diagram of a typical RFID system. Referring to FIG. 1, the RFID system includes an RFID reader 10 and an RFID tag 20. The RFID reader 10 transmits a signal and the RFID tag 20 responds with a corresponding signal.

The RFID reader 10 includes an antenna 11, an RF filter 12, a directional coupler 13, a transmitter 14, a frequency synthesizer 15, a receiver 16, and a digital unit 17. According to a communication protocol of a passive RFID system, when the transmitter 14 of the RFID reader 10 receives a baseband signal from the digital unit 17, a modulated signal and a continuous wave (CW) signal are transmitted alternately.

When the RFID reader 10 transmits a modulated signal, the RFID tag 20 only receives the modulated signal and does not transmit a reflected signal, such that there is no signal received by the RFID reader 10. However, when the RFID reader 10 transmits a CW signal, there is a reflected signal from the RFID tag 20, which needs to be processed by the receiver 16 of the RFID reader 10.

The RFID tag 20 absorbs a portion of a CW signal from the RFID reader 10 and reflects the remaining CW signal. The RFID reader 10 simultaneously receives a signal while transmitting a CW signal. Accordingly, the same frequency is used in the RFID reader 10 during the process of transmitting and receiving a signal.

The transmitter 14 generates a CW signal and transmits it to the directional coupler 13. When the CW signal passes through the directional coupler 13, a portion of the CW signal is transmitted to the receiver 16, and the remaining signal passes through the RF filter 12 and the antenna 11 before is transmitted to the RFID tag 20.

In the RFID reader 10, because only one antenna for transmitting and receiving a signal is used, the transmitting and receiving of the signal are separated using the directional coupler 13. That is, a transmit signal is delivered only in an antenna direction through the directional coupler 13. However, because of the imperfect transmit/receive isolation of the directional coupler 13, a leakage signal flows in the receiver direction.

The receiver 16 simultaneously receives a leakage signal $S_L$ leaked from the transmitter 14 and a RFID tag reflected signal $S_R$ from the RFID tag 20. Accordingly, it is difficult for the receiver 16 to demodulate only the RFID tag reflected signal $S_R$ from the RFID tag 20.

FIGS. 2A through 2E are graphs illustrating signal spectrums of the RFID system of FIG. 1. FIG. 2A illustrates a signal spectrum of a transmit signal 1 transmitted from the transmitter 14 of the passive RFID system of FIG. 1. FIG. 2B illustrates a signal spectrum of a leakage signal 2 leaked from the transmitter 14 of the RFID system toward the receiver 16. FIG. 2C illustrates a signal spectrum of RFID tag reflected signals 3, 4a, and 4b in the RFID tag 20 of the passive RFID system of FIG. 1. The RFID tag reflected signal includes a carrier wave component 3 and modulated components 4a and 4b including tag information.

FIG. 2D illustrates a signal spectrum of a synthesize signal combined with the leakage signal $S_L$ of FIG. 2B and the RFID tag reflected signal $S_R$ of FIG. 2C in the receiver 16 of the passive RFID system. The RFID reader 10 should extract only the modulated components 4a and 4b. However, because of a significant flow amount of the leakage signal 2, the carrier wave component 3 of a receive signal is increased. Therefore, aliasing (where spectrums of the carrier wave component 3 and the modulated components 4a and 4b overlap) occurs such that it is difficult to extract only the modulated components 4a and 4b.

FIG. 2E illustrates a signal spectrum of a signal after filtering in the receiver 16 when there is no leakage signal in the passive RFID system of FIG. 1. FIG. 2F illustrates a signal spectrum of signals after filtering in the receiver 16 when there is a leakage signal in the passive RFID system of FIG. 1. Comparing FIG. 2E and FIG. 2F, when there is no leakage signal component, only the modulated component can be extracted after filtering, but it is impossible to extract only the modulated component when there is a leakage signal component because the modulated component and the leakage signal component are synthesized after filtering.

To resolve limitations due to a leakage signal, a method of extracting a portion of a transmit signal through a directional coupler of a transmitter has been proposed. However, this method also has limitations such as power loss of a transmit signal.

SUMMARY OF THE INVENTION

Exemplary embodiments of the present invention seek to provide an RFID reader capable of cancelling a leakage signal without power loss of a transmit signal.

A radio frequency identification (RFID) reader for cancelling a leakage signal, according to an exemplary embodiment of the present invention, includes a digital unit calculating and storing an amplitude and a phase of the leakage signal, and a leakage cancellation circuit generating a leakage cancellation signal to cancel the leakage signal in response to a control of the digital unit.

The leakage cancellation signal may have a same amplitude and a phase opposite to that of the leakage signal.

The leakage cancellation circuit may receive a local oscillator signal from a frequency synthesizer to generate the leakage cancellation signal.

The leakage cancellation circuit may receive an output signal from a frequency up-conversion mixer of a transmitter to generate the leakage cancellation signal.

The leakage cancellation circuit may receive a transmit signal of a transmitter to generate the leakage cancellation signal.

The RFID reader may further include a directional coupler receiving the leakage cancellation signal from the leakage cancellation circuit and cancelling the leakage signal.

The RFID reader may further include a Wilkinson combiner receiving the leakage cancellation signal from the leakage cancellation circuit and cancelling the leakage signal.

The RFID reader may further include a differential amplifier receiving the leakage cancellation signal from the leakage cancellation circuit and cancelling the leakage signal.

The leakage cancellation circuit may include a phase shifter receiving a phase control signal from the digital unit and adjusting a phase of the leakage cancellation signal, and a drive amplifier receiving an amplitude control signal from the digital unit and adjusting an amplitude of the leakage cancellation signal.

The digital unit may generate the phase control signal and the amplitude control signal during a tag operation.

The digital unit may calculate the amplitude and the phase of the leakage signal during an initialization operation.

The RFID reader may further include a first directional coupler transmitting a transmit signal of a transmitter to an antenna, and a second directional coupler receiving the leakage cancellation signal from the leakage cancellation circuit and cancelling the leakage signal produced by the first directional coupler.

A method for canceling a leakage signal in a radio frequency identification (RFID) reader, according to an exemplary embodiment of the present invention, includes calculating and storing an amplitude and a phase of the leakage signal, and generating a leakage cancellation signal to cancel the leakage signal based on the calculated amplitude and phase of the leakage signal.

BRIEF DESCRIPTION OF THE DRAWINGS

Exemplary embodiments of the present invention will become apparent by reference to the following detailed description taken in conjunction with the accompanying drawings, wherein.

DETAILED DESCRIPTION OF EXEMPLARY EMBODIMENTS

Hereinafter, exemplary embodiments of the present invention will be described in detail with reference to the accompanying drawings.

Figure 1:
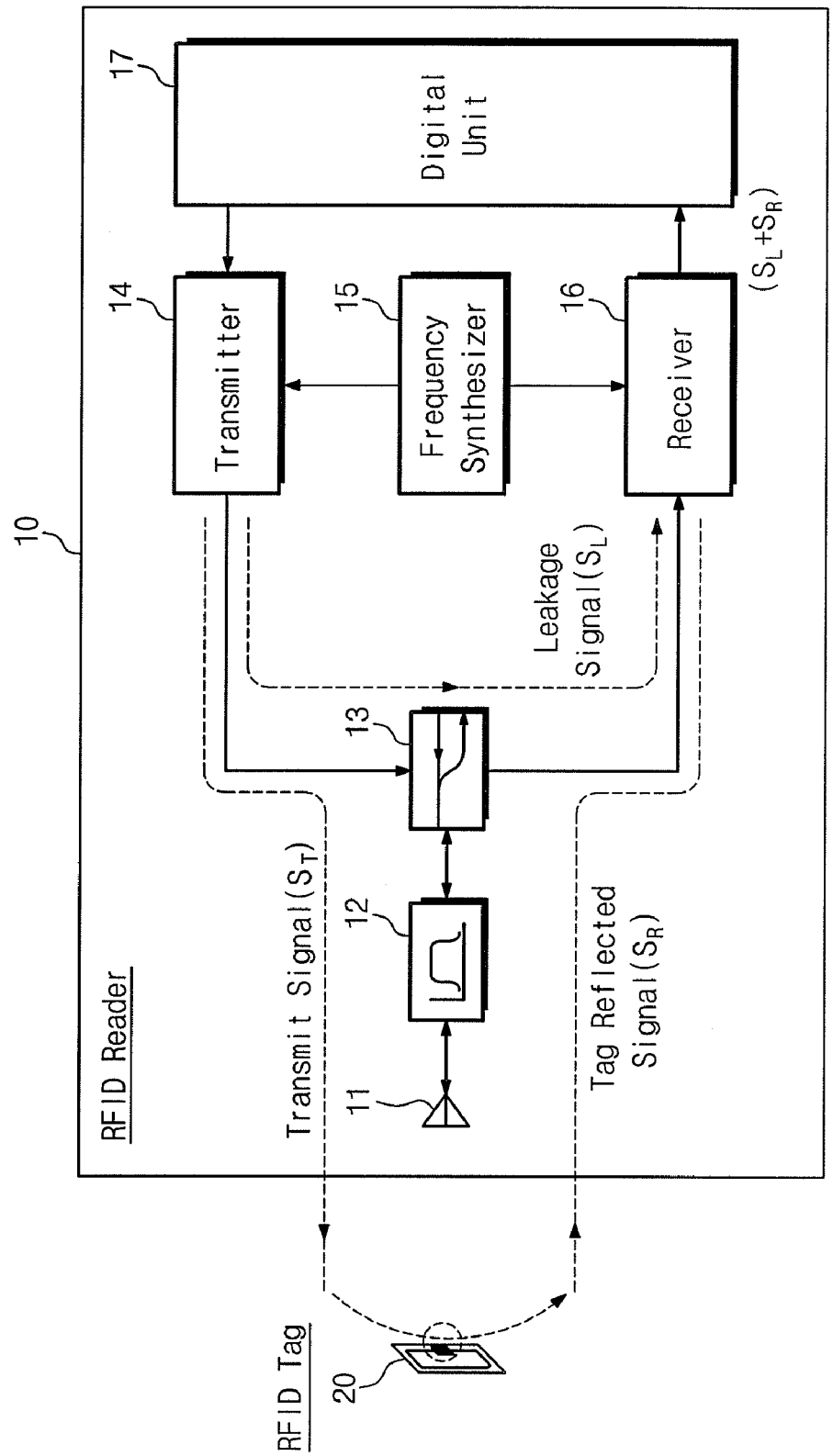
FIG. 1 is a block diagram of a typical RFID system.
Figure 2A:
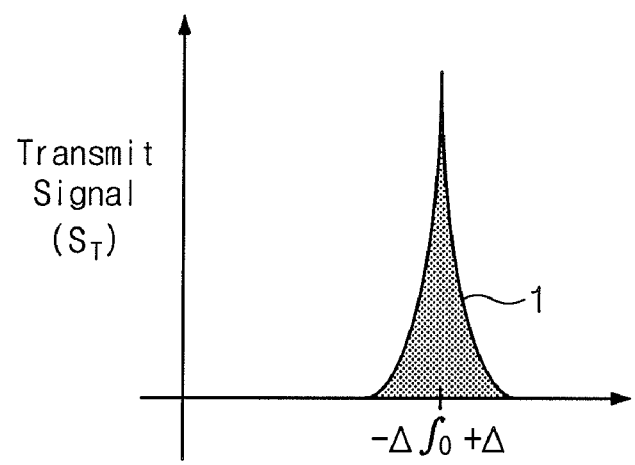
FIGS. 2A through 2F are graphs illustrating signal spectrums of the RFID system of FIG. 1.
Figure 2B:
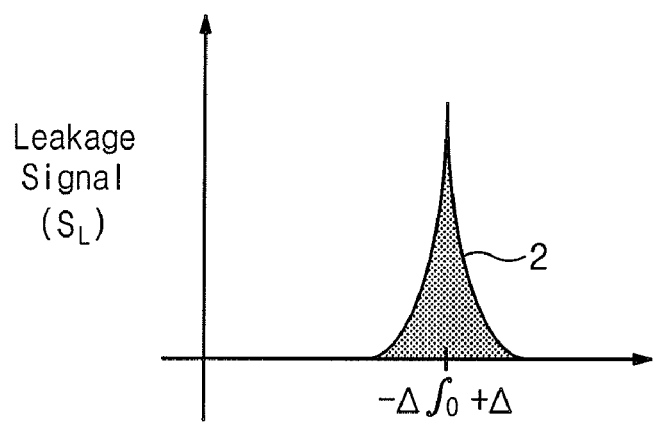
Figure 2C:
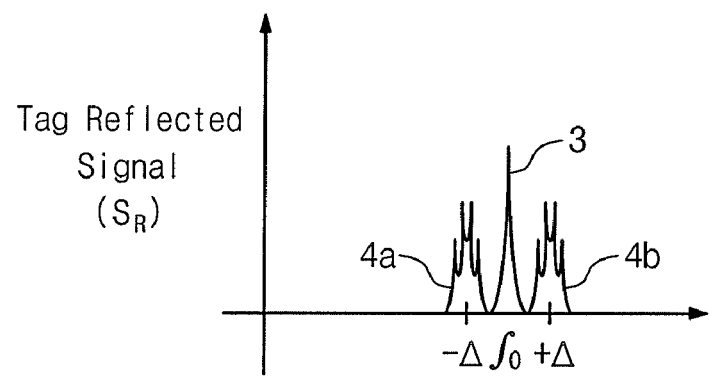
Figure 2D:
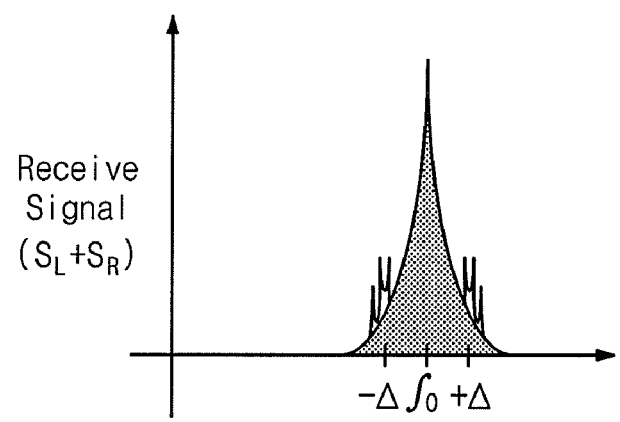
Figure 2E:
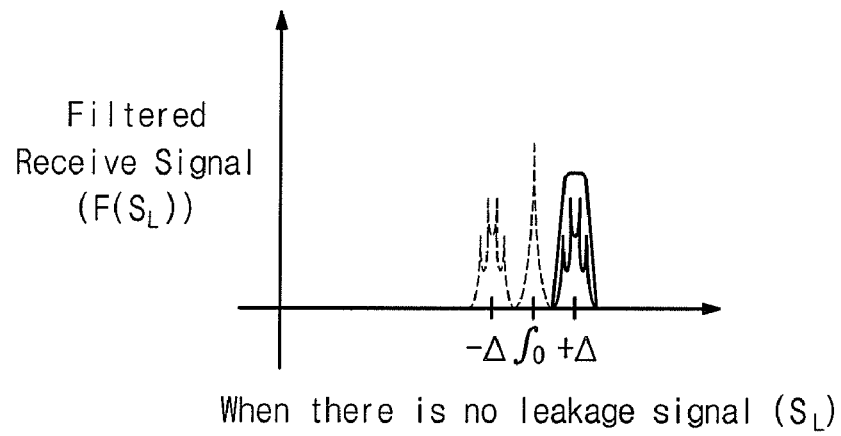
Figure 2F:
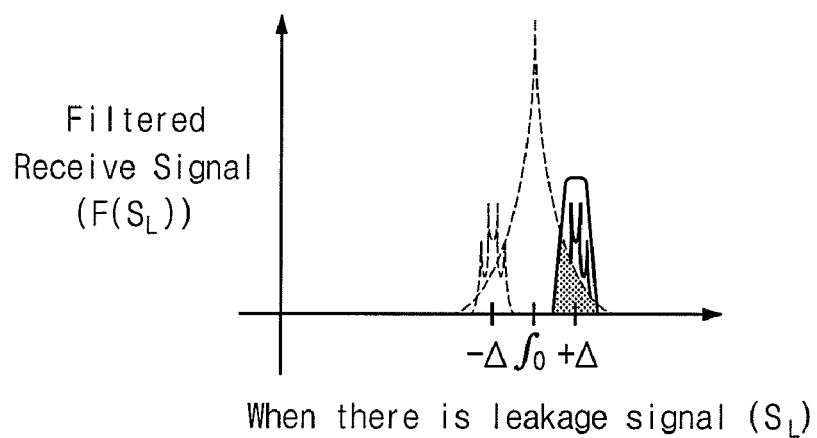
Figure 3:
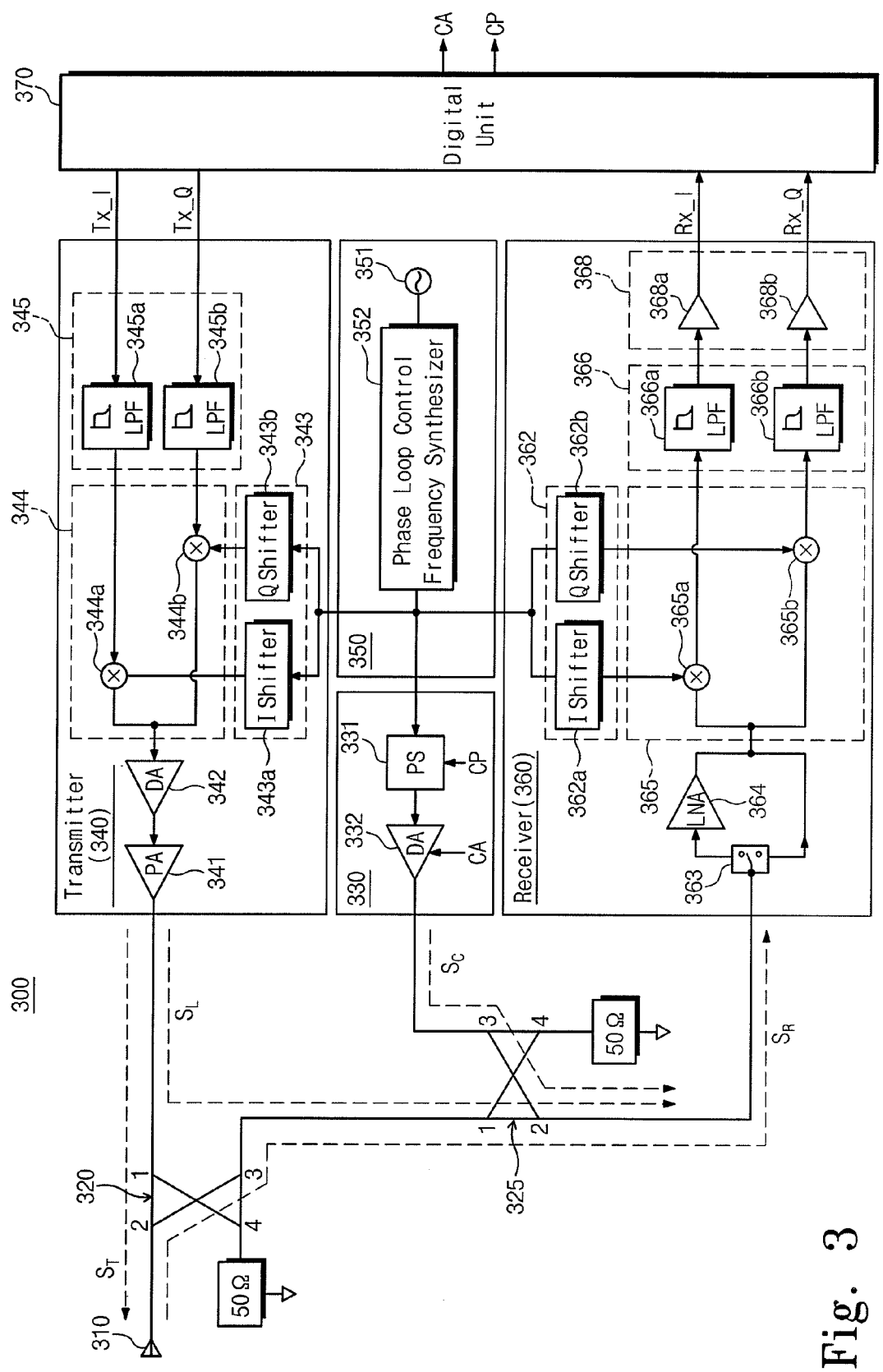
FIG. 3 is a block diagram of an RFID reader according to an exemplary embodiment of the present invention.

FIG. 3 is a block diagram of a radio frequency identification (RFID) reader according to an exemplary embodiment of the present invention. The RFID reader 300 according to an exemplary embodiment of the present invention cancels a leakage signal without power loss of a receive signal. Referring to FIG. 3, the RFID reader 300 includes an antenna 310, a first directional coupler 320, a second directional coupler 325, a leakage cancellation circuit 330, a transmitter 340, a frequency synthesizer 350, a receiver 360, and a digital unit 370.

The RFID reader 300 cancels a leakage signal $S_L$ through the leakage cancellation circuit 330 and the second directional coupler 325. The RFID reader 300 calculates an amplitude and a phase of the leakage signal $S_L$ during an initial operation (e.g., power up), and then stores the calculated result in the digital unit 370. The RFID reader 300 cancels the leakage signal $S_L$ according to a control of the digital unit 370 during a tag operation.

The first directional coupler 320 has a terminating resistance of about 50 Ω, for example, and transmits a transmit signal $S_T$ from the transmitter 340 to the antenna 310 through a terminal 1-2. The antenna 310 transmit the transmit signal $S_T$ to an RFID tag (not shown). The first directional coupler 320 receives a reflected signal $S_R$ of the RFID tag through the antenna 310. The reflected signal $S_R$ is transmitted to the receiver 360 through a terminal 2-3 of the first directional coupler 320.

Therefore, the first directional coupler 320 separates transmission from reception by using a directional division method. However, as mentioned above, the transmit/receive isolation of a directional coupler is not perfect. Accordingly, a leakage signal $S_L$ may leak in a receiver direction. The leakage signal $S_L$ is synthesized with a reflected signal $S_R$ and the synthesized signal $S_R+S_L$ flows into the receiver 360 such that it is difficult to separate only the reflected signal $S_R$ from the synthesized signal $S_R+S_L$.

The RFID reader 300 generates a leakage cancellation signal $S_C$ to cancel the leakage signal $S_L$. The leakage signal $S_L$ is provided in the receiver direction through a terminal 3-2 of the second directional coupler 325.

The second directional coupler 320 has a terminating resistance of about 50 Ω, for example, and receives a reflected signal $S_R$ and a leakage signal $S_L$ through the terminal 1-2. The leakage signal $S_L$ inputted into a terminal 1-2 of the second directional coupler 325 and a leakage cancellation signal $S_C$ inputted into a terminal 3-2 are cancelled therebetween. Herein, the leakage cancellation signal $S_C$ may have the same magnitude as the leakage signal $S_L$, and may have a phase opposite to that of the leakage signal $S_L$. The leakage cancellation signal $S_C$ and the leakage signal $S_L$ cancel each other before flowing into the receiver 360.

Referring to FIG. 3, the leakage cancellation circuit 330 includes a phase shifter 331 and a drive amplifier 332. The phase shifter 331 receives a local oscillator signal L0 from the frequency synthesizer 350 and a phase control signal CP from the digital unit 370, and generates a path signal having a phase difference of 180° with respect to the leakage signal $S_L$. The drive amplifier 332 receives the path signal from the phase shifter 331 and an amplitude control signal CA from the digital unit 370, and generates a leakage cancellation signal $S_C$.

The transmitter 340 includes a power amplifier 341, a drive amplifier 342, a shifter 343, a frequency up-conversion mixer 344, and a filter 345. The transmitter 340 receives baseband signals Tx_I and Tx_Q from the digital unit 370, and outputs a transmit signal $S_T$ into the first directional coupler 320 through the filter 345, the frequency up-conversion mixer 344, the drive amplifier 342, and the power amplifier 341.

The shifter 343 includes an I shifter 343a and a Q shifter 343b. The frequency up-conversion mixer 344 includes a first frequency up-conversion mixer 344a and a second frequency up-conversion mixer 344b. The filter 345 includes a first filter 345a and a second filter 345b.

The I shifter 343a transmits an I path signal (an In-Phase signal) to the first frequency up-conversion mixer 344a. The I path signal has a phase difference of 0° with respect to the local oscillator signal L0 from the frequency synthesizer 350. The Q shifter 343b transmits a Q path signal to the second frequency up-conversion mixer 344b. The Q path signal has a phase difference of 90° with respect to the local oscillator signal L0 from the frequency synthesizer 355.

The first frequency up-conversion mixer 344a receives a baseband signal Tx_I from the first filter 345a and a local oscillator signal L0 from the I shifter 343a, and mixes the signals. The second frequency up-conversion mixer 344b receives a baseband signal Tx_Q from the second filter 345b and a local oscillator signal L0 form the Q shifter 343b, and mixes the signals.

The frequency synthesizer 350 synthesizes preferred high frequency signals and provides a local oscillator signal L0 to the leakage cancellation circuit 330, the transmitter 340, and the receiver 360. The frequency synthesizer 350 includes a crystal oscillator 351 and a phase loop control frequency synthesizer 352.

The crystal oscillator 351 outputs a stable frequency. The phase loop control frequency synthesizer 352 synchronizes a phase with a signal from the crystal oscillator 351 and simultaneously synthesizes a preferred high frequency signal. The phase loop control frequency synthesizer 352 is a circuit used for obtaining a stable high frequency signal with less frequency chirping because it is synchronized with an output signal of the crystal oscillator 351.

The receiver 360 includes a shifter 362, a switcher 363, a low noise amplifier 364, a frequency down-conversion mixer 365, a filter 366, and a calculation amplifier 368. The receiver 360 transmits baseband signals Rx_I and Rx_Q to the digital unit 370 through the frequency down-conversion mixer 365, the filter 366, and the calculation amplifier 368.

A reflected signal $S_R$ transmitted to the receiver 360 may be transmitted through the low noise amplifier 364, or may be directly transmitted without the low noise amplifier 364 under the control of the switcher 363.

The switcher 363 determines whether the reflected signal $S_R$ is directly transmitted to the frequency down-conversion mixer 365 according to a control signal (not shown) of the digital unit 370. That is, the switcher 363 directly transmits the reflected signal $S_R$ to the frequency down-conversion mixer 365 when an intensity of the reflected signal $S_R$ is greater than a predetermined intensity. However, when the intensity of the reflected signal SR is less than the predetermined intensity, the reflected signal SR is transmitted to the frequency down-conversion mixer 365 through the low noise amplifier 364.

The shifter 362 includes an I shifter 362a and a Q shifter 363b. The I shifter 362a generates an I path signal (an In-Phase signal) and then transmits the signal to the first frequency down-conversion mixer 365a. The I path signal has a phase difference of 0° with respect to the local oscillator signal L0 from the frequency synthesizer 350. The Q shifter 362b generates a Q path signal and then transmits the signal to the second frequency down-conversion mixer 365b. The Q path signal has a phase difference of 90° with respect to the local oscillator signal L0 from the frequency synthesizer 350.

The frequency down-conversion mixer 365 includes a first frequency down-conversion mixer 365a and a second frequency down-conversion mixer 365b. The first frequency down-conversion mixer 365a mixes the reflected signal $S_R$ with the local oscillator signal L0 inputted from the I shifter 362a. The second frequency down-conversion mixer 365b mixes the reflected signal $S_R$ with the local oscillator signal L0 inputted from the Q shifter 362b.

The filter 366 includes a first filter 366a and a second filter 366b. The first filter 366a filters a frequency down-conversion mix signal from the first frequency down-conversion mixer 365a. The second filter 366b filters a frequency down-conversion mix signal from the second frequency down-conversion mixer 365b.

The calculation amplifier 368 includes a first calculation amplifier 368a and a second calculation amplifier 368b. The first calculation amplifier 368a calculation-amplifies a filtered signal from the first filter 366a and outputs a baseband signal Rx_I to the digital unit 390. The second calculation amplifier 368b calculation-amplifies a filtered signal from the second filter 366b and outputs a baseband signal Rx_Q to the digital unit 390.

Now, referring to FIGS. 3 and 4, a process of calculating a leakage signal $S_L$ and a leakage cancellation signal $S_C$ in the receiver 360 during an initial operation (e.g., power up) will be described in detail.

Figure 4:
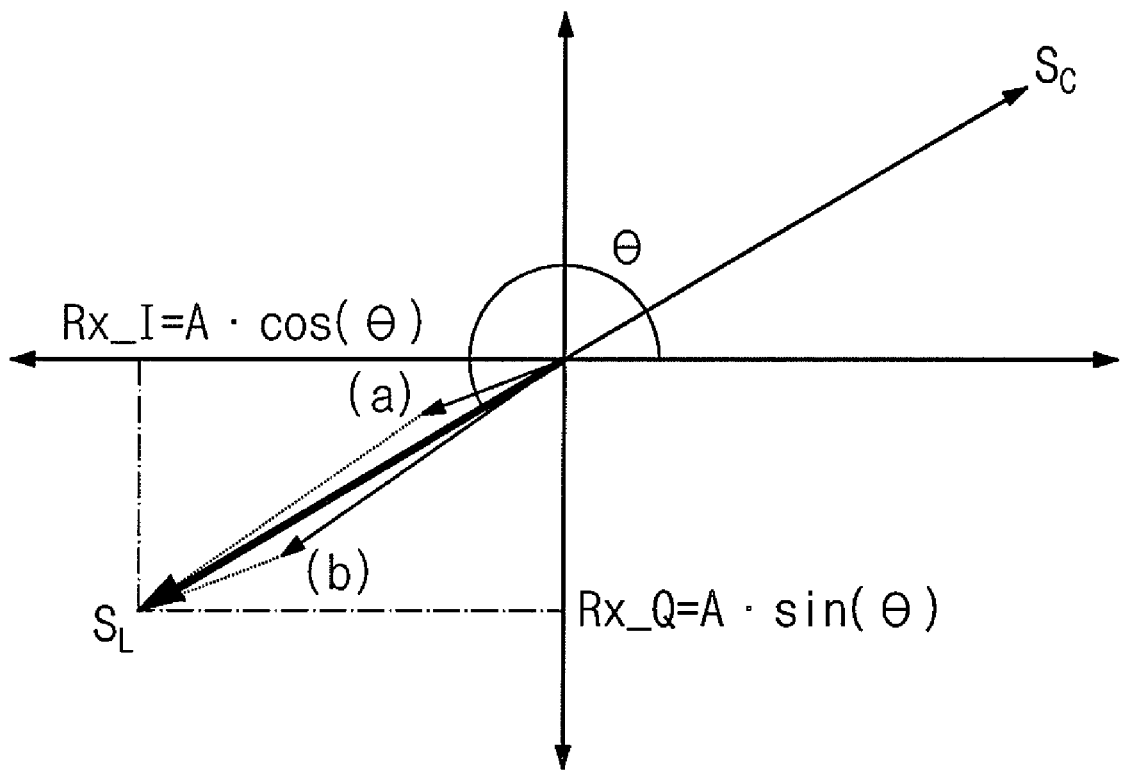
FIG. 4 is a graph illustrating a method of calculating a leakage signal and a leakage cancellation signal.

Referring to FIG. 4, the leakage signal $S_L$ is generated due to coupler leakage and antenna return loss. The leakage signal $S_L$ may be expressed as the sum of the two signals as illustrated in FIG. 4.

On the other hand, baseband signals Rx_I and Rx_Q inputted into the digital unit 370 of FIG. 3 may be expressed using Equation 1.

$$RxI = A \cos(\theta)$$

$$RxQ = A \sin(\theta) \quad \text{[Equation 1]}$$

where A represents an amplitude of the leakage signal $S_L$ and θ represents a phase of the leakage signal $S_L$.

The leakage signal $S_L$ can be calculated by measuring the baseband signals Rx_I and Rx_Q inputted into the digital unit 370 during an initial operation. The amplitude and phase of the leakage signal $S_L$ may be calculated using the following Equation 2.

$$A = \sqrt{RxI^2 + RxQ^2} \quad \text{[Equation 2]}$$

$$\theta = \tan^{-1}\left(\frac{RxQ}{RxI}\right)$$

A leakage cancellation signal $S_C$, as illustrated in FIG. 4, has the same amplitude A as the leakage signal $S_L$ and has a phase opposite to that of the leakage signal $S_L$. The digital unit 370 calculates the amplitude A and the phase θ of the leakage signal $S_L$ during an initial operation, and generates an amplitude control signal CA and a phase control signal CP during a tag operation. The leakage cancellation circuit 330 generates a leakage cancellation signal $S_C$ in response to the amplitude control signal CA and the phase control signal CP of the digital unit 370.

The RFID reader 300 according to an exemplary embodiment of the present invention calculates the amplitude A and the phase θ of the leakage signal $S_L$ during an initial operation, and stores the calculations in the digital unit 370. Since the leakage cancellation circuit 330 generates the leakage cancellation signal $S_C$ in response to the amplitude control signal CA and the phase control signal CP of the digital unit 370 during a tag operation, it cancels out the leakage signal $S_L$.

Figure 5:
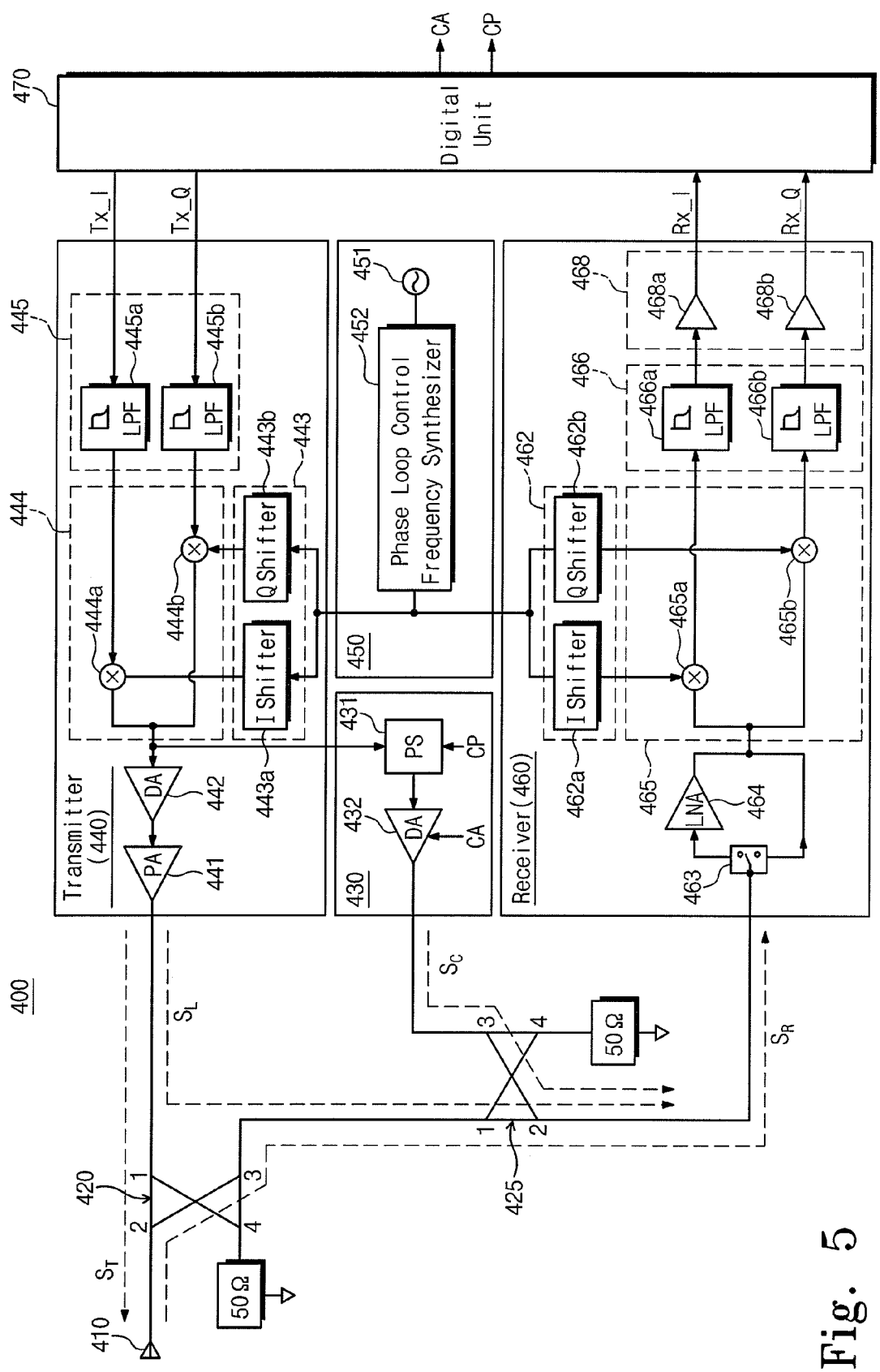
FIG. 5 is a block diagram of an RFID reader according to an exemplary embodiment of the present invention.

FIG. 5 is a block diagram of an RFID reader according to an exemplary embodiment of the present invention. The RFID reader 400 cancels out the leakage signal $S_L$ without power loss of the transmit signal $S_T$.

Referring to FIG. 5, an RFID reader 400 includes an antenna 410, a first directional coupler 420, a second directional coupler 425, a leakage cancellation circuit 430, a transmitter 440, a frequency synthesizer 450, a receiver 460, and a digital unit 470. Here, the RFID reader 400 of FIG. 5 is the same as the RFID reader 300 of FIG. 4 except for the configurations of the leakage cancellation circuit 430.

The leakage cancellation circuit 430 generates a leakage cancellation signal $S_C$ to cancel a leakage signal $S_L$. The leakage cancellation signal $S_C$ is provided in a receiver direction through a terminal 3-2 of the second directional coupler 425.

The leakage cancellation circuit 430 includes a phase shifter 431 and a drive amplifier 432. The phase shifter 431 receives an output signal of a frequency up-conversion mixer 444 and a phase control signal CP from the digital unit 370, and generates a path signal having a phase difference of 180° with respect to the leakage signal $S_L$. The drive amplifier 432 receives a path signal from the phase shifter 431 and an amplitude control signal CA from the digital unit 470, and generates a leakage cancellation signal $S_C$. The leakage cancellation signal $S_C$ has the same amplitude as the leakage signal $S_L$ and has a phase opposite to that of the leakage signal $S_L$.

The RFID reader 400 according to an exemplary embodiment of the present invention receives an output signal of the frequency up-conversion mixer 444 during an initial operation, and calculates an amplitude A and a phase θ of the leakage signal $S_L$. Information about the amplitude A and the phase θ of the leakage signal $S_L$ is stored in the digital unit 470. Since the RFID reader 400 generates the leakage cancellation signal $S_C$ in response to the amplitude A of the digital unit 470 and phase control signals CA and CP during a tag operation, the leakage signal $S_L$ can be cancelled.

Figure 6:
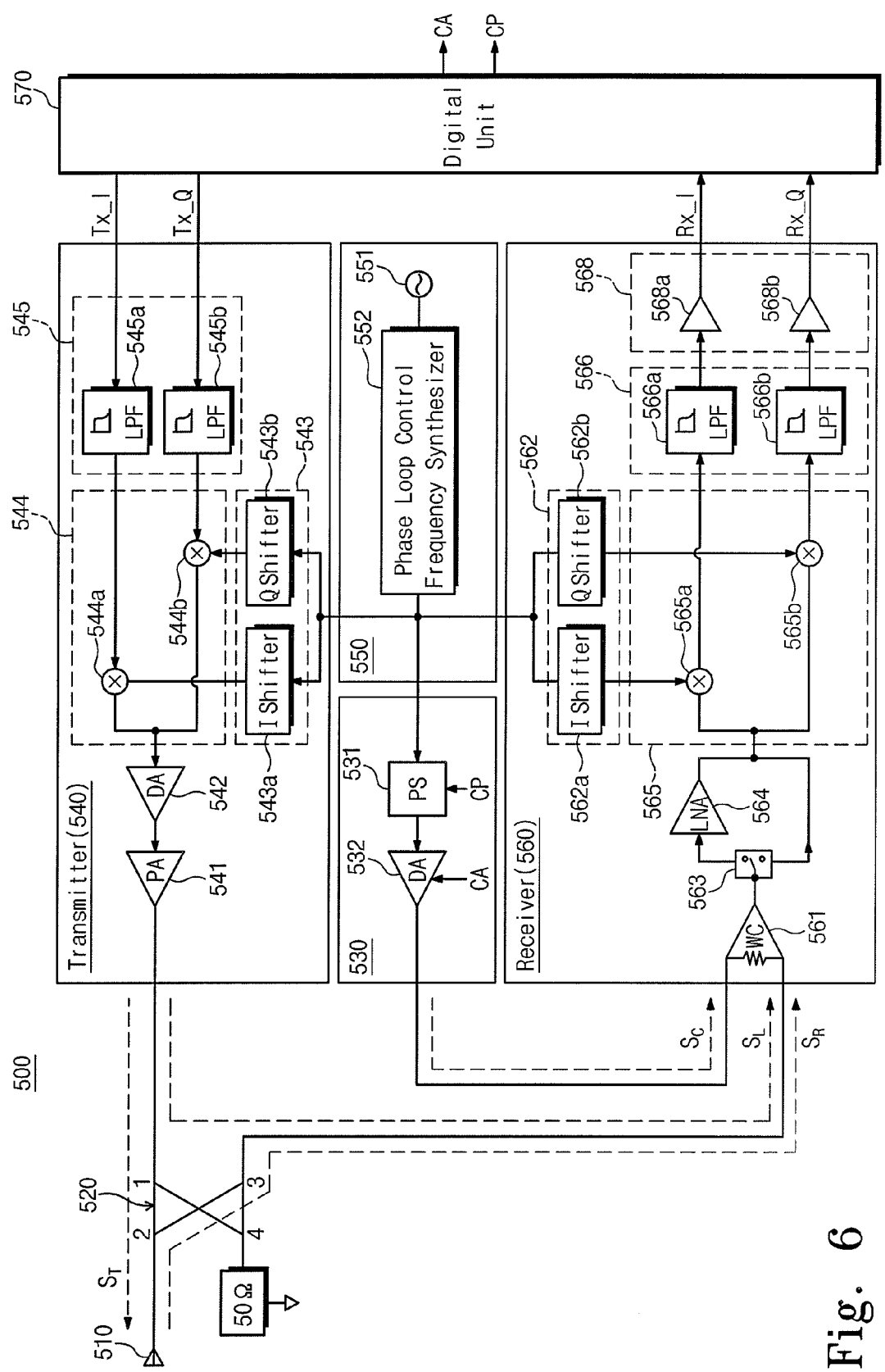
FIG. 6 is a block diagram of an RFID reader according to an exemplary embodiment of the present invention.

FIG. 6 is a block diagram of an RFID reader according to an exemplary embodiment of the present invention. The RFID reader 500 cancels out a leakage signal $S_L$ without power loss of a transmit signal $S_T$.

Referring to FIG. 6, an RFID reader 500 includes an antenna 510, a directional coupler 520, a leakage cancellation circuit 530, a transmitter 540, a frequency synthesizer 550, a receiver 560, and a digital unit 570. Here, the RFID reader 500 of FIG. 6 uses a Wilkinson combiner instead of the second directional couplers 325 and 425 of FIGS. 3 and 5.

The leakage cancellation circuit 530 includes a phase shifter 531 and a drive amplifier 532. The phase shifter 531 receives a local oscillator signal L0 of the frequency synthesizer 550 and a phase control signal CP of the digital unit 570, and generates a path signal having a phase difference of 180° with respect to the leakage signal $S_L$. The drive amplifier 532 receives a path signal from the phase shifter 531 and an amplitude control signal CA from the digital unit 570. The leakage cancellation signal $S_C$ has the same amplitude as the leakage signal $S_L$ and an opposite phase. The leakage cancellation circuit 530, as illustrated in FIG. 5, receives an output of a frequency up-conversion mixer 544 and generates the leakage cancellation signal $S_C$.

The receiver 560 includes a Wilkinson combiner 561. The Wilkinson combiner 561 receives a leakage signal $S_L$ and a leakage cancellation signal $S_C$, and cancels the leakage signal $S_L$. The Wilkinson combiner 561 cancels the leakage signal $S_L$ and provides a reflected signal $S_R$ to a low noise amplifier 564 or a frequency down-conversion mixer 565.

The RFID reader 500 according to an exemplary embodiment of the present invention calculates an amplitude A and a phase θ of the leakage signal $S_L$ during an initialization operation. The RFID reader 500 generates the leakage cancellation signal $S_C$ in response to the amplitude of the digital unit 570 and phase control signals CA and CP during a tag operation. The leakage signal $S_L$ and the leakage cancellation signal $S_C$ are mutually cancelled through the Wilkinson combiner 561.

Figure 7:
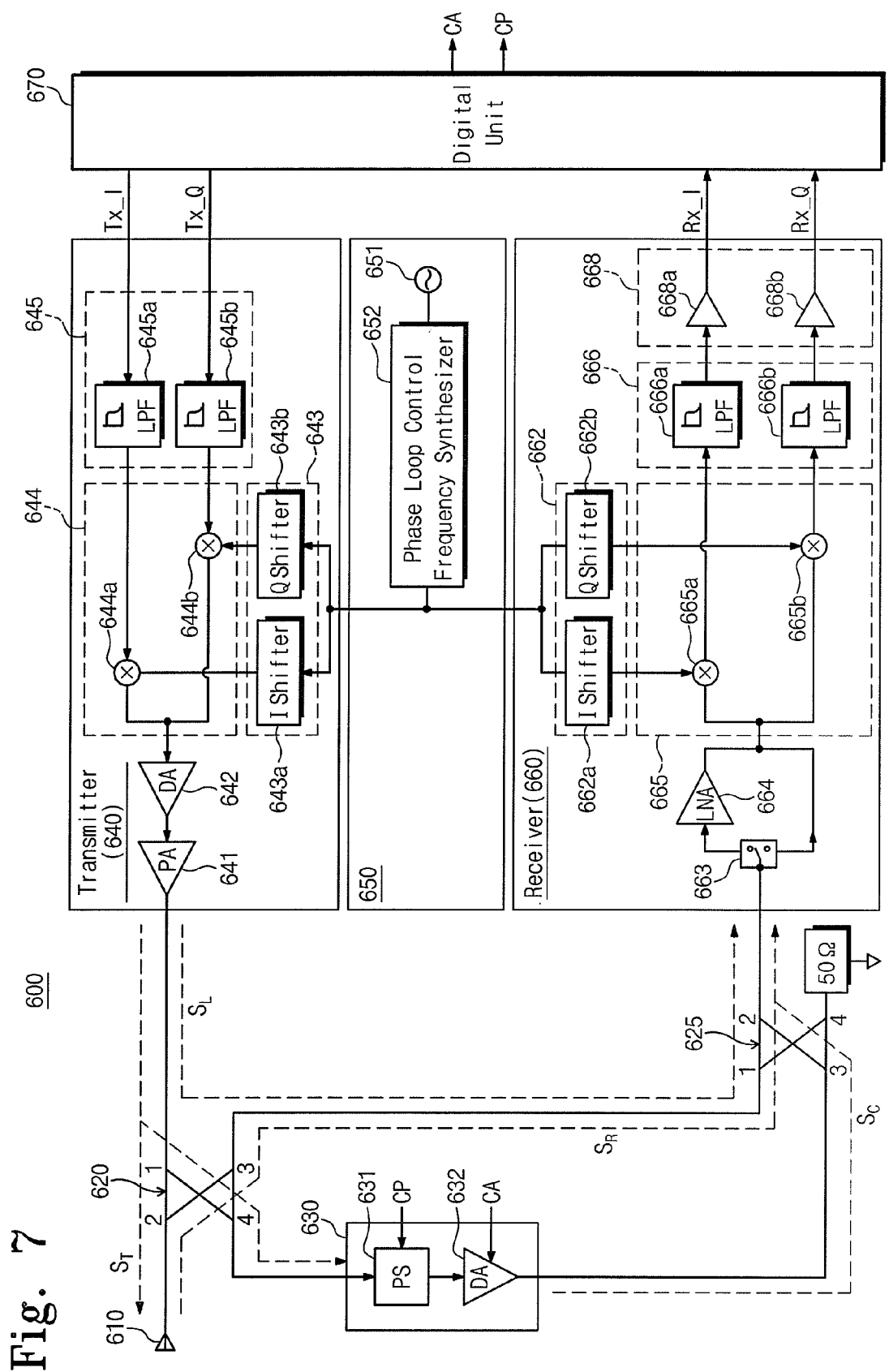
FIG. 7 is a block diagram of an RFID reader according to an exemplary embodiment of the present invention.

FIG. 7 is a block diagram of an RFID reader according to an exemplary embodiment of the present invention. Referring to FIG. 7, an RFID reader 600 includes an antenna 610, a first directional coupler 620, a second directional coupler 625, a leakage cancellation circuit 630, a transmitter 640, a frequency synthesizer 650, a receiver 660, and a digital unit 670.

Because the RFID reader 600 of FIG. 7 cancels a leakage signal $S_L$ under the control of the digital unit 670, overall power consumption can be reduced. The structure of FIG. 7 is identical to that of FIG. 3 except for the location of the leakage cancellation circuit 630.

The leakage cancellation circuit 630 includes a phase shifter 631 and a drive amplifier 632. The phase shifter 631 receives a predetermined transmit signal $S_T$ and a phase control signal CP from the digital unit 670, and generates a path signal having a phase difference of 180° with respect to a leakage signal $S_L$. The drive amplifier 632 receives a path signal from the phase shifter 631 and an amplitude control signal CA from the digital unit 670 to generate a leakage cancellation signal $S_C$. The leakage cancellation signal $S_C$ has the same amplitude as the leakage signal $S_L$ and an opposite phase.

The second directional coupler 625 has a terminating resistance of 50 Ω, and receives a reflected signal $S_R$ and a leakage signal $S_L$ through a terminal 1-2. The leakage signal $S_L$ inputted to the terminal 1-2 of the second directional coupler 625 and a leakage cancellation signal $S_C$ inputted to a terminal 3-2 are mutually cancelled. The leakage cancellation signal $S_C$ may have the same amplitude as the leakage signal $S_L$ and may have an opposite phase. The leakage cancellation signal $S_C$ and the leakage signal $S_L$ are mutually cancelled before entering the receiver 660.

The RFID reader 600 according to an exemplary embodiment of the present invention calculates an amplitude A and a phase θ of the leakage signal $S_L$ during an initial operation. The RFID reader 600 generates a leakage cancellation signal $S_C$ in response to the amplitude A of the digital unit 670 and the phase control signals CA and CP. The leakage cancellation circuit 630 does not operate during a read operation, and only operates during a tag operation. Accordingly, overall power consumption is reduced by controlling the digital unit 670.

Figure 8:
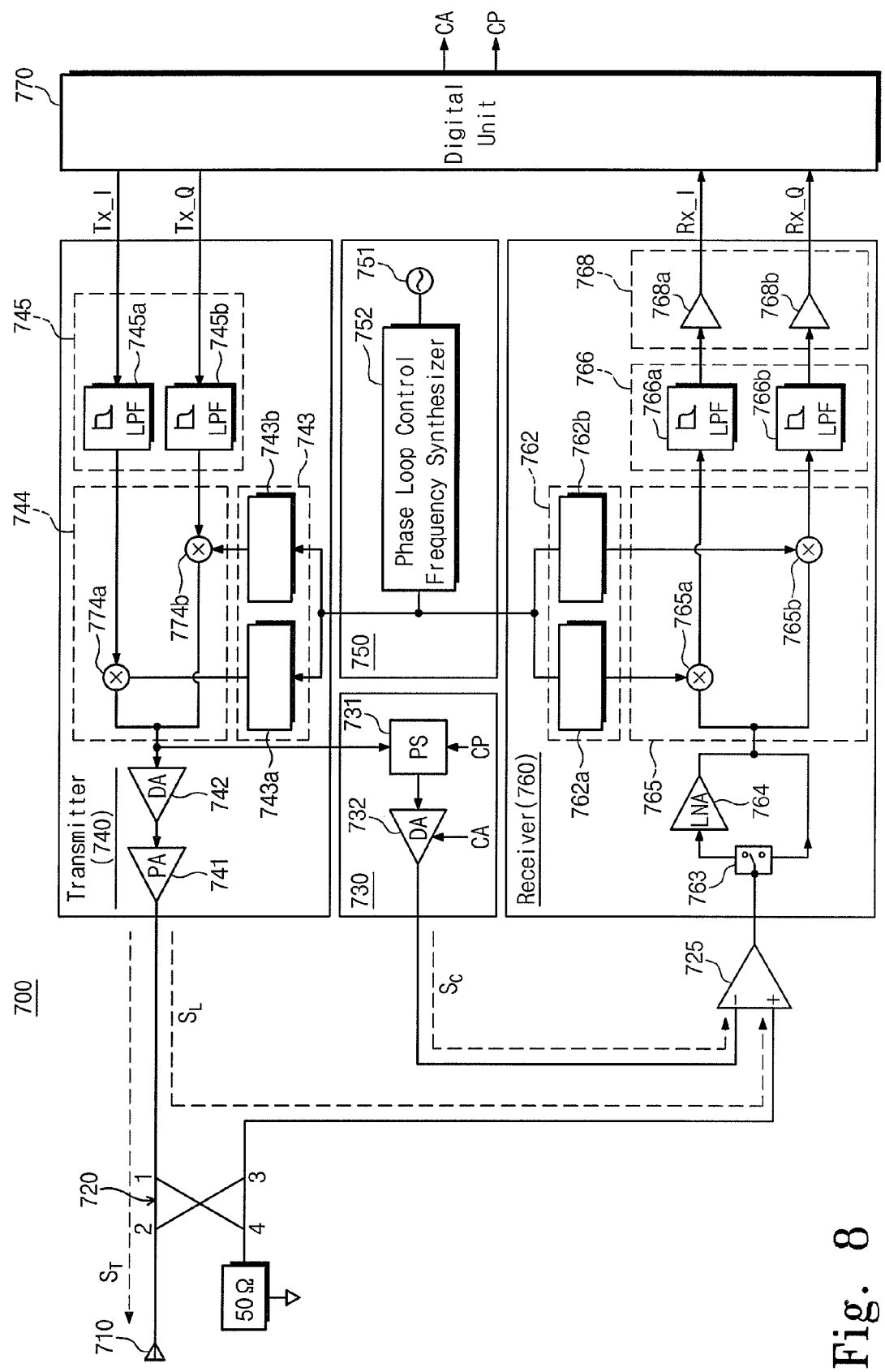
FIG. 8 is a block diagram of an RFID reader according to an exemplary embodiment of the present invention.

FIG. 8 is a block diagram of an RFID reader according to an exemplary embodiment of the present invention. The RFID reader 700 cancels out a leakage signal $S_L$ without power loss of a transmit signal $S_T$.

Referring to FIG. 8, an RFID reader 700 includes an antenna 710, a directional coupler 720, a leakage cancellation circuit 730, a transmitter 740, a frequency synthesizer 750, a receiver 760, and a digital unit 770. The RFID reader 700 of FIG. 8 uses a differential amplifier 725 instead of the Wilkinson combiner 561 of FIG. 6.

The differential amplifier 725 receives a leakage signal $S_L$ and a leakage cancellation signal $S_C$ to cancel the leakage cancellation signal $S_C$. The differential amplifier 725 cancels the leakage signal $S_L$ and provides a reflected signal $S_R$ to a low noise amplifier 765 or a frequency down-conversion mixer 765.

The RFID reader according to an exemplary embodiment of the present invention cancels a leakage signal without power loss of a transmit signal. A typical RFID reader extracts a portion of a transmit signal and then removes a leakage signal resulting in power loss of the transmit signal. In contrast, embodiments of the present invention do not extract a transmit signal, and cancel a leakage signal such that there is no power loss of the transmit signal. Because a leakage current is cancelled without power loss of a transmit signal, a tag recognition rate and a recognition distance are increased.

Exemplary embodiments of the present invention may be realized with a drive amplifier and a phase shifter. Additionally, exemplary embodiments of the present invention may be realized with a leakage cancellation circuit, a directional coupler, a Wilkinson combiner, or a differential amplifier, which are controlled by a digital unit.

Moreover, because the cancelling of a leakage signal $S_L$ is controlled by a digital unit, overall power consumption is reduced. That is, because the digital unit drives a leakage cancellation circuit only during a tag operation, overall power consumption of an RFID reader is reduced.

According to exemplary embodiments of the present invention, a leakage current is cancelled without power loss of a transmit signal. Additionally, because the leakage current is cancelled under the control of a digital unit, overall power consumption is reduced.

Although exemplary embodiments of the present invention have been described for illustrative purposes, those skilled in the art will appreciate that various modifications, additions and substitutions are possible, without departing from the scope and spirit of the disclosure.

What is claimed is:

1. A radio frequency identification (RFID) reader for cancelling a single antenna return loss and a leakage signal of the RFID reader, comprising:
    a digital unit configured to calculate and store an amplitude and a phase of the single antenna return loss and the leakage signal based upon baseband signals received by the digital unit during an initial non-tag operation;
    a leakage cancellation circuit configured to generate a single antenna return loss and leakage cancellation signal to cancel the single antenna return loss and leakage signal in response to a control of the digital unit,
    a first directional coupler configured to transmit to a single antenna transmit signal from a transmitter coupled to the digital unit; and
    a second directional coupler configured to receive the single antenna return loss and leakage cancellation signal from the leakage cancellation circuit and to cancel the single antenna return loss and leakage signal from the first directional coupler,
    wherein the leakage cancellation circuit is between the first directional coupler and the second directional coupler, and
    wherein the digital unit is configured to control the leakage cancellation circuit using the stored amplitude and phase without using an error signal fed back to the leakage cancellation circuit based upon a sensed downconverted tag signal, a sensed downconverted tag signal from a downconverter/demodulator, or a feedback signal from a detector comprising a Schottky diode, low-pass filter and a buffer amplifier coupled to the second directional coupler wherein the feedback signal is received either during a tag operation or an initial non-tag operation.

2. The RFID reader of claim 1, wherein the single antenna return loss and leakage cancellation signal has a same amplitude and a phase opposite to that of the single antenna return loss and leakage signal.

3. The RFID reader of claim 1, wherein the leakage cancellation circuit receives the transmit signal of a transmitter to generate the single antenna return loss and leakage cancellation signal.

4. The RFID reader of claim 1, wherein the leakage cancellation circuit comprises: a phase shifter receiving a phase control signal from the digital unit and adjusting a phase of the single antenna return loss and leakage cancellation signal; and a drive amplifier receiving an amplitude control signal from the digital unit and adjusting an amplitude of the single antenna return loss and leakage cancellation signal.

5. The RFID reader of claim 4, wherein the digital unit generates the phase control signal and the amplitude control signal during a tag operation.

6. A method for canceling a single antenna return loss and a leakage signal in a radio frequency identification (RFID) reader comprising:
    calculating and storing an amplitude and a phase of the single antenna return loss and the leakage signal based upon baseband signals received by a digital unit during an initial non-tag operation; and
    generating a single antenna return loss and leakage cancellation signal to cancel the single antenna return loss and leakage signal based upon the calculated amplitude and phase of the single antenna return loss and leakage signal,
    wherein the leakage signal is a leakage signal that leaks from a directional coupler coupled to single antenna of the RFID reader during a tag operation,
    wherein the single antenna return loss and leakage cancellation signal is provided by a leakage cancellation circuit between the first directional coupler and a second directional coupler coupled to a receiver, and
    wherein the digital unit is configured to control the leakage cancellation circuit using the stored amplitude and phase without using an error signal fed back to the leakage cancellation circuit based upon a sensed downconverted tag signal, a sensed downconverted tag signal from a downconverter/demodulator, or a feedback signal from a detector comprising a Schottky diode, low-pass filter and a buffer amplifier coupled to the second directional coupler wherein the feedback signal is received either during a tag operation or an initial non-tag operation.

7. The method of claim 6, wherein the single antenna return loss and leakage cancellation signal has a same amplitude and a phase opposite to that of the single antenna return loss and leakage signal.

8. The method of 6, further comprising receiving the transmit signal of a transmitter to generate the single antenna return loss and leakage cancellation signal.

9. The method of claim 6, wherein the single antenna return loss and leakage signal is cancelled during a tag operation.

10. The method of claim 6, wherein a phase and an amplitude of the single antenna return loss and leakage cancellation signal is adjusted during a tag operation.

* * * * *